United States Patent
Niga

(10) Patent No.: US 10,958,844 B2
(45) Date of Patent: Mar. 23, 2021

(54) CONTROL APPARATUS AND CONTROL METHOD

(71) Applicant: CANON KABUSHIKI KAISHA, Tokyo (JP)

(72) Inventor: Shota Niga, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/389,830

(22) Filed: Apr. 19, 2019

(65) Prior Publication Data
US 2019/0349530 A1 Nov. 14, 2019

(30) Foreign Application Priority Data
May 11, 2018 (JP) .............................. JP2018-092329

(51) Int. Cl.
*H04N 5/232* (2006.01)

(52) U.S. Cl.
CPC ..... *H04N 5/23299* (2018.08); *H04N 5/23203* (2013.01)

(58) Field of Classification Search
CPC ........... H04N 5/23206; H04N 5/23216; H04N 5/23299
USPC ....................................... 348/211.99, 333.02
See application file for complete search history.

(56) References Cited

U.S. PATENT DOCUMENTS

| | | | | |
|---|---|---|---|---|
| 7,538,815 B1* | 5/2009 | Belikov | ................... | G02B 7/36 348/345 |
| 7,839,926 B1 | 11/2010 | Metzger | | |
| 2007/0003268 A1* | 1/2007 | Uchiyama | .............. | G03B 17/02 396/125 |
| 2007/0025711 A1* | 2/2007 | Marcus | .................. | G03B 29/00 396/56 |
| 2011/0234832 A1* | 9/2011 | Ezoe | .................. | H04N 5/23206 348/222.1 |
| 2014/0253783 A1 | 9/2014 | Springer et al. | | |
| 2015/0356715 A1* | 12/2015 | Nakata | .................. | G06F 1/1616 715/719 |
| 2017/0003860 A1 | 1/2017 | Kozakura | | |
| 2017/0041530 A1* | 2/2017 | Kimura | .............. | H04N 5/23206 |
| 2017/0180618 A1* | 6/2017 | Georgiev | ............... | G02B 7/102 |
| 2019/0349532 A1* | 11/2019 | Niga | .................. | H04N 5/23296 |

FOREIGN PATENT DOCUMENTS

| | | |
|---|---|---|
| CN | 1460998 A | 12/2003 |
| CN | 102170524 A | 8/2011 |
| CN | 203311078 U | 11/2013 |
| CN | 103792760 A | 5/2014 |
| CN | 103873770 A | 6/2014 |
| EP | 2950285 A1 | 12/2015 |
| JP | 2010130633 A | 6/2010 |
| JP | 2017163301 A | 9/2017 |
| WO | 2013/055737 A1 | 4/2013 |

* cited by examiner

*Primary Examiner* — Anthony J Daniels
(74) *Attorney, Agent, or Firm* — Canon U.S.A., Inc. IP Division

(57) ABSTRACT

A control apparatus for an imaging apparatus having a drive unit for tilting of an imaging element includes a tilt angle setting unit configured to set a tilt angle, and a control unit configured to perform control so as not to change a parameter that affects the tilt angle during tilt angle setting.

7 Claims, 10 Drawing Sheets

CONTROL APPARATUS AND CONTROL METHOD

BACKGROUND OF THE INVENTION

Field of the Invention

The present invention relates to a control apparatus having a drive unit for rotating an imaging element, and to a control method for the imaging apparatus.

Description of the Related Art

Conventionally, there has been a case where a monitoring camera is installed at a high position (e.g. overhead camera), and the optical axis of the camera is directed obliquely downward, so that the monitoring camera monitors people walking on a road and captures an image of a car and the number plate of the car. In this case, the focal plane of the camera (which, as will be understood by those skilled in the art, lies on a plane perpendicular to the camera's optical axis) may lie on a different plane to the object (e.g. person/car) to be imaged. That is, the plane of the object to be imaged may not be inclined perpendicularly to the optical axis of the camera when the camera views/images the object at an angle from an elevated position. Accordingly, when viewing an image of the object on a screen, only a part of the image may be in focus, whereas the rest of the image may be out-of-focus. To address this issue, there is a method for increasing the depth of field by reducing the aperture size of an optical system so as to prevent/minimize an out-of-focus state. However, in a monitoring camera that performs image capturing under a low light condition, the image capturing is often performed with its aperture in a fully opened state or nearly fully opened state. Opening the aperture to this extent results in a shallow depth of field and the entire image does not necessarily become in an in-focus state over the entire screen. As a result, the entire image capturing, or large portions of it, may performed in an out-of-focus state. To address this issue, there is a method for increasing a depth of field range by inclining the imaging lens of the camera relative to its imaging element, e.g. by using a tiltable lens such as a tilt-shift (TS) lens. Meanwhile, there is a technique for increasing a depth of field range by inclining an imaging element relative to a lens.

Japanese Patent Application Laid-Open No. 2017-163301 discusses a related technique. According to this technique, a rotation drive unit capable of changing the tilt angle of an imaging element is provided, and the tilt angle is controlled using the rotation drive unit, based on a panning or tilting angle in an imaging direction. Japanese Patent Application Laid-Open No. 2010-130633 also discusses a related technique. According to this technique, a tilt angle is calculated based on a tilt angle of an imaging apparatus, focal length information of an imaging optical system, and object-distance information indicating a distance to a main object. Further, the tilt angle of an imaging element is adjusted based on the calculated tilt angle.

However, for example, when adjusting the zoom setting of an imaging apparatus (e.g. camera) that includes a device for adjusting the tilt angle of its imaging element, the zoom lens of the apparatus may move during setting/adjustment of the tilt angle of its imaging element. As a result, the position of the zoom lens may change relative to the position of the imaging element. This changes the focus position and accordingly makes it difficult to adjust the tilt angle appropriately.

SUMMARY OF THE INVENTION

The present invention is directed to a control apparatus capable of smoothly setting parameters of an imaging apparatus that has a rotation device for tilting the angle of its imaging element.

According to an aspect of the present invention, a control apparatus for an imaging apparatus including a drive unit for rotation of an imaging element, includes a tilt angle setting unit configured to set a tilt angle based on a user operation, and a control unit configured to perform control so as not to change a parameter that affects the tilt angle during tilt angle setting.

Further features of the present invention will become apparent from the following description of exemplary embodiments with reference to the attached drawings.

DESCRIPTION OF THE EMBODIMENTS

Figure 1:
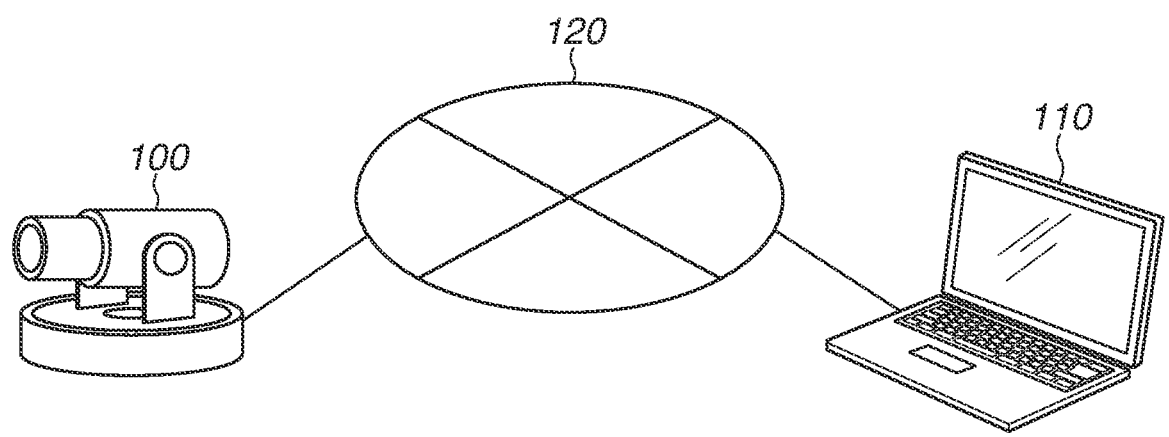
FIG. 1 is an overall view of a monitoring system according to a first exemplary embodiment.

FIG. 1 is an overall view of a monitoring system according to a first exemplary embodiment. A monitoring camera 100 and a control apparatus 110 are communicably connected with each other via a network. The control apparatus 110 transmits various commands to the monitoring camera 100. The monitoring camera 100 transmits responses to those commands to the control apparatus 110. In the monitoring camera 100, zoom and focus can be adjusted.

Figure 2:
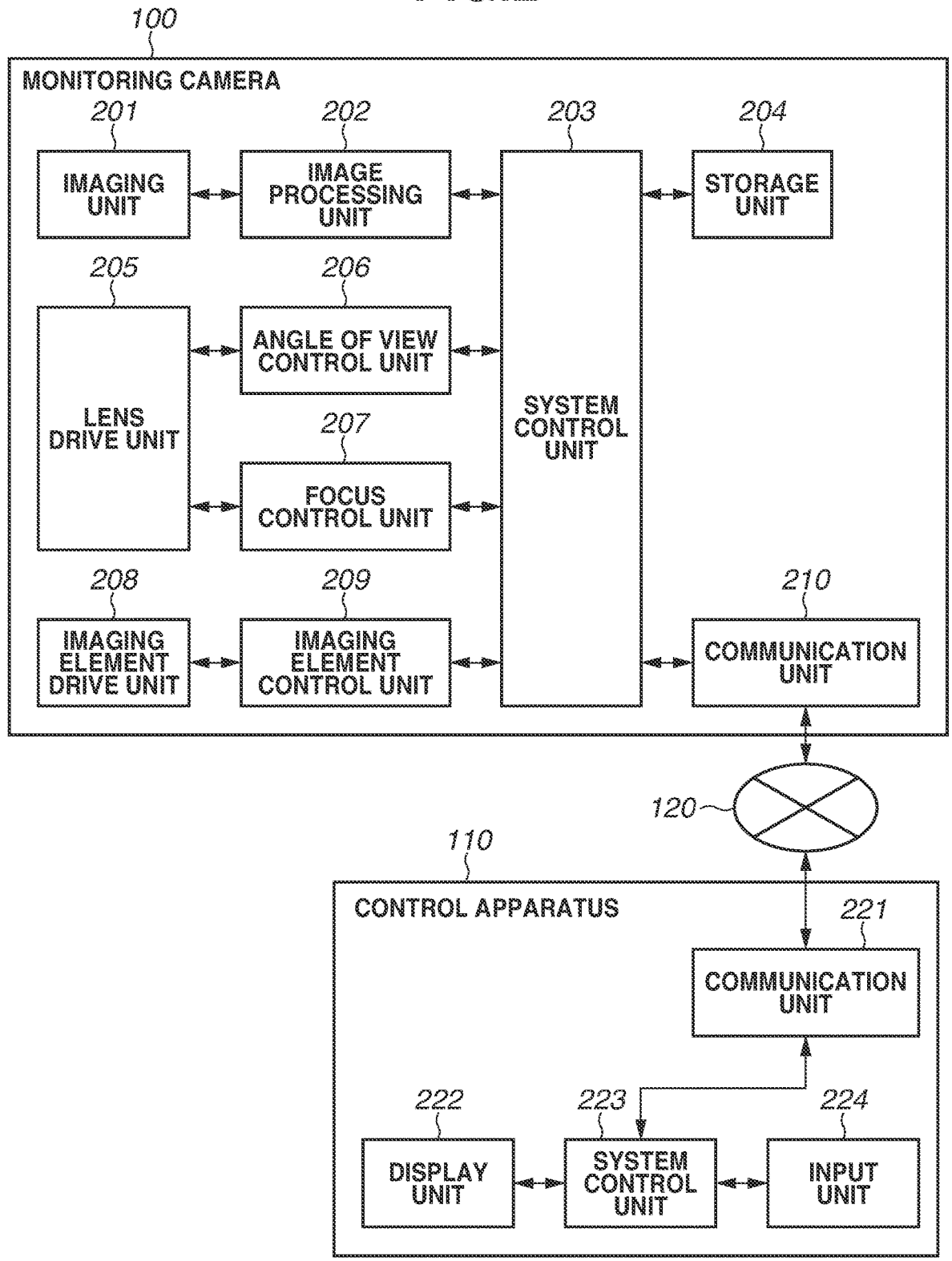
FIG. 2 is a block diagram illustrating a hardware configuration of the monitoring system.

FIG. 2 is a block diagram illustrating a hardware configuration of the monitoring system. The monitoring camera 100 includes an imaging unit 201, an image processing unit 202, a system control unit 203, and a storage unit 204. The monitoring camera 100 further includes a lens drive unit 205, an angle of view control unit 206, a focus control unit 207, an imaging element drive unit 208, an imaging element control unit 209, and a communication unit 210.

The imaging unit 201 includes a lens and an imaging element, and performs imaging of an object and conversion into an electrical signal. The image pickup element may be a CMOS image sensor, CCD image sensor or other type of image sensor. The image processing unit 202 generates video data by performing predetermined image processing and encoding processing on a signal obtained by the imaging unit 201 capturing an image and photoelectrically converting the captured image.

The system control unit 203 controls the entire control apparatus 110. The system control unit 203 analyzes a camera control command transmitted from the control apparatus 110 and performs processing corresponding to the command. For example, the system control unit 203 may receive, from the control apparatus 110, a request command for requesting a live video image. In response to this request, the system control unit 203 of the monitoring camera 100 may deliver the video data generated by the image processing unit 202 to the control apparatus 110 via its communication unit 210.

The system control unit 203 may also receive, from the control apparatus 110, a request command for requesting a setting value for each of the zoom, the focus, and the tilt angle of the monitoring camera 100. In response to this received command, the system control unit 203 then deliver the setting value of each of the angle of view control unit 206, the focus control unit 207, and the imaging element control unit 209 to the control apparatus 110 via its communication unit 210. The system control unit 203 may also receive a setting command from the control apparatus 110. When receiving the setting command from control apparatus 110, the system control unit 203 provides an instruction for performing control based on a setting value included the setting command to the control unit (each of the angle of view control unit 206, the focus control unit 207, and the imaging element control unit 209) corresponding to the setting command. As a result, the setting values related to the zoom, the focus, and the tilt angle set by the control apparatus 110 is reflected in the monitoring camera 100.

The storage unit 204 stores video images into an internal storage and an external storage. The system control unit 203 reads out a program in the storage unit 204 and executes this program, so that a function and processing (described below) of the control apparatus 110 are implemented.

The angle of view control unit 206 provides an instruction for changing the zoom lens position to the lens drive unit 205, based on the zoom setting value transmitted from the system control unit 203. The focus control unit 207 provides an instruction for changing the focus lens position to the lens drive unit 205, based on the focus setting value transmitted from the system control unit 203. The imaging element control unit 209 provides an instruction for changing the tilt angle of the imaging element to the imaging element drive unit 208, based on the tilt angle setting value transmitted from the system control unit 203.

The communication unit 210 delivers the video data to the control apparatus 110 via a network 120. Further, the communication unit 210 receives various commands transmitted from the control apparatus 110 and conveys the received commands to the system control unit 203. The commands transmitted from the control apparatus 110 mainly include the request command for requesting the live video image, the request command for requesting the setting value for each of the zoom, the focus, and the tilt angle of the monitoring camera 100, and the setting command for setting each of the zoom, the focus, and the tilt angle of the monitoring camera 100.

The control apparatus 110 includes a communication unit 221, a display unit 222, a system control unit 223, and an input unit 224. The communication unit 221 receives various pieces of data delivered from the monitoring camera 100, and transmits various commands issued from the control apparatus 110. The various pieces of data mainly include information about an imaging angle of view including the zoom information, information about the focus, information about the rotation, and the video data of the monitoring camera 100. The display unit 222 is a device such as a liquid crystal display device. The display unit 222 displays an image acquired from the monitoring camera 100 and a graphical user interface (GUI) for performing camera control.

The system control unit 223 generates a camera control command based on a GUI operation performed by a user, and transmits the generated camera control command to the monitoring camera 100 via the communication unit 221. Further, the system control unit 223 displays the video data received from the monitoring camera 100 via the communication unit 221, and data representing setting values for the imaging angle of view including the zoom, the focus, and the tilt angle, on the display unit 222. For the input unit 224, pointing devices such as a keyboard and a mouse are used, and the user of the control apparatus 110 operates a GUI via the input unit 224.

Figure 3:
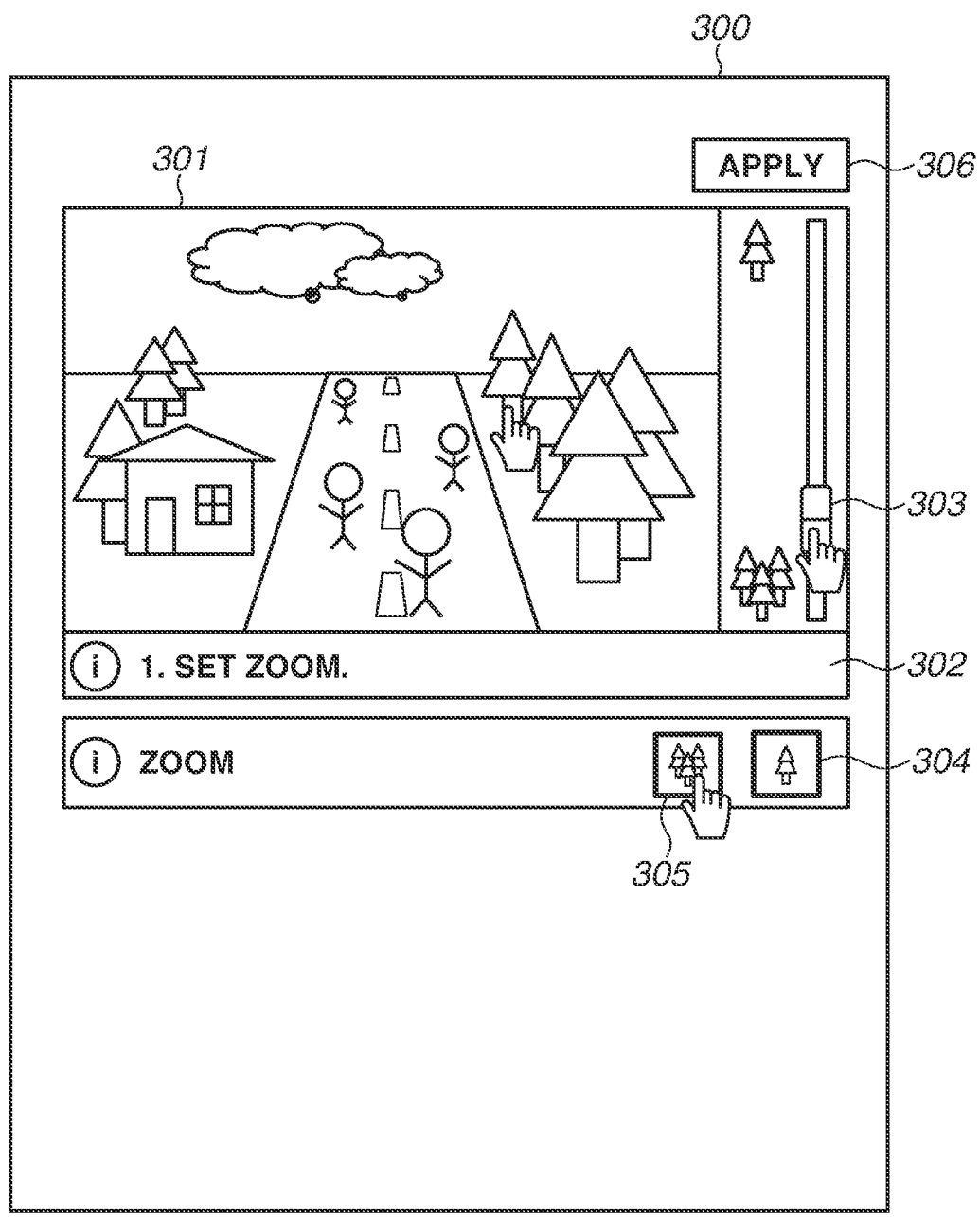
FIG. 3 is a diagram illustrating an example of a zoom setting screen.

FIG. 3 is a diagram illustrating an example of a zoom setting screen 300. The zoom setting screen 300 is a GUI displayed on the display unit 222 of the control apparatus 110. A user operation is performed on the zoom setting screen 300 via the input unit 224. The zoom setting screen 300 includes a video display area 301, a text display area 302, a zoom control slider bar 303, a zoom-in button 304, a zoom-out button 305, and an application button 306 for terminating the setting of the zoom, and shifting to a focus setting screen. The control apparatus 110 receives zoom information from the monitoring camera 100 and displays the zoom information on the zoom setting screen 300. In the present exemplary embodiment, the zoom information is the information about the zoom, and includes the zoom setting value. The zoom information is displayed on the zoom setting screen 300, in various forms by using elements such as a numerical value, text, and a slider bar.

The live video image delivered from the monitoring camera 100 is displayed in the video display area 301. Information for prompting the user to set the zoom and information about the imaging angle of view including the current zoom setting value is displayed in the text display area 302. In addition, an explanation of each of various buttons and the zoom control slider bar 303 on the zoom setting screen 300 is displayed in the text display area 302.

The user can control the zooming of the monitoring camera 100 via the zoom control slider bar 303, the zoom-in button 304, and the zoom-out button 305. When the user operates any one of the zoom control slider bar 303, the zoom-in button 304, and the zoom-out button 305, the control apparatus 110 transmits a setting command for the zoom setting to the monitoring camera 100 via the network 120. In a case where the user operates the zoom control slider bar 303 in an upward direction or presses the zoom-in button 304, the monitoring camera 100 obtains a video image by zooming in and performing imaging based on the imaging angle of view displayed in the video display area 301 of the control apparatus 110. In a case where the user operates the zoom control slider bar 303 in a downward direction or presses the zoom-out button 305, the monitoring camera 100 performs imaging to obtain a video image in a zooming-out manner based on an imaging angle of view displayed in the video display area 301 of the control apparatus 110.

The control apparatus 110 receives a live video image, from the monitoring camera 100, after the imaging angle of view is changed due to the zooming, and displays the received live video image in the video display area 301. In a case where the user presses the application button 306, the display of the display unit 222 switches from the zoom setting screen 300 to a focus setting screen 400 illustrated in FIG. 4. In addition to the button type and the slider bar type illustrated in FIG. 3, various types of the methods such as a mouse wheel type and a text box type are conceivable for the zoom setting method. In a case where the monitoring camera 100 includes a pan drive mechanism, a tilt drive mechanism, and a turning drive mechanism for a lens barrel unit, a setting interface for those mechanisms can also be displayed on the zoom setting screen 300.

Figure 4:
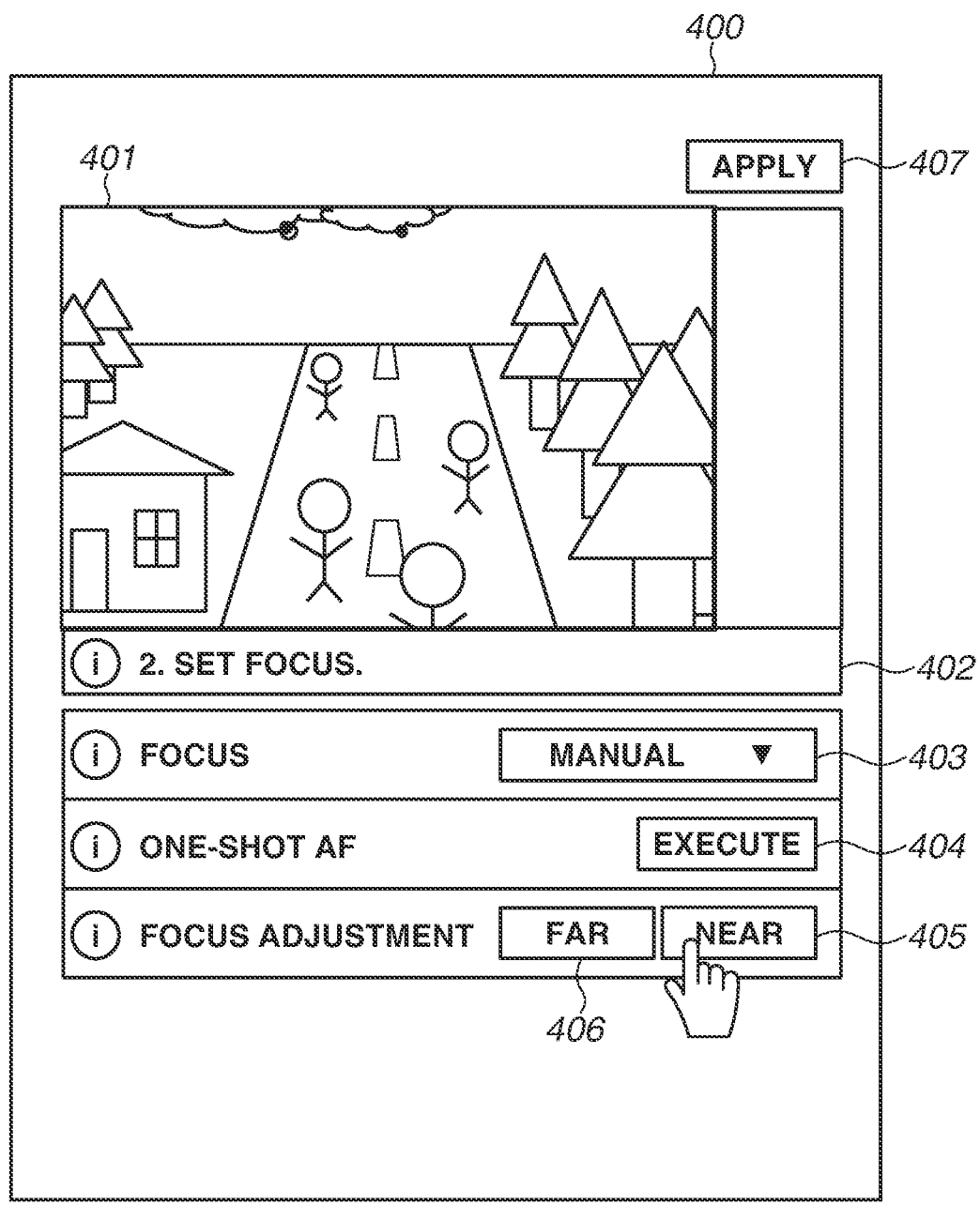
FIG. 4 is a diagram illustrating a display example of a focus setting screen.

FIG. 4 is a diagram illustrating a display example of the focus setting screen 400 to be displayed on the display unit 222 of the control apparatus 110. The focus setting screen 400 includes a video display area 401, a text display area 402, a focus mode display field 403, a one-shot autofocus (AF) execution button 404 for automatically performing the focusing once, a focus near adjustment button 405, a focus far adjustment button 406, and an application button 407 for terminating the focus setting and shifting to a tilt angle setting screen. The control apparatus 110 receives a setting value related to the focus from the monitoring camera 100 and displays the received setting value on the focus setting screen 400.

In the present exemplary embodiment, conceivable examples of the focus mode of the monitoring camera 100 include a manual mode, an autofocus mode, and a fixed-at-infinity mode. The manual mode is a mode in which the user manually adjusts the lens position of the focus lens. The AF mode is a mode in which the monitoring camera 100 continues adjusting the lens position of the focus lens automatically so that in-focus state is maintained in a central area of the imaging angle of view. The fixed-at-infinity mode is a mode in which the monitoring camera 100 moves the focus lens to a lens position at which in-focus state can be obtained at infinity recorded in the focus lens. This is a mode mainly used to capture an image of a distant scenery or a distant object. In the fixed-at-infinity mode, an object existing near cannot, generally, come into focus. Further, the monitoring camera 100 has a one-shot AF function of executing the AF only once for an imaging angle of view in a state where the focus mode is the manual mode, and returning the focus mode to the manual mode afterward.

The live video image delivered from the monitoring camera 100 is displayed in the video display area 401. Information for prompting the user to set the focus and information about the focus setting value are displayed in the text display area 402. Information such as an explanation of each of various buttons on the focus setting screen 400 is also displayed in the text display area 402. In the setting of the rotation, the focus mode is fixed to the manual mode and accordingly, only the manual mode is displayed as the focus mode in the focus mode display field 403.

The user executes the AF only once by pressing the one-shot AF execution button 404, so that the central area of the imaging angle of view of the monitoring camera 100 can be in-focus state. In addition, in a case where the user presses the focus near adjustment button 405, the focus can be adjusted to a nearby area, in the imaging angle of view of the monitoring camera 100. On the other hand, in a case where the user presses the focus far adjustment button 406, the focus can be adjusted to a distant area. In a case where the user operates either the focus near adjustment button 405 or the focus far adjustment button 406, the control apparatus 110 transmits a setting command for setting the focus to the monitoring camera 100 via the network 120. In a case where the user presses the application button 407, the display unit 222 of the control apparatus 110 changes the display of the GUI from the focus setting screen 400 to a tilt angle setting screen 500 to be described below.

Figure 5:
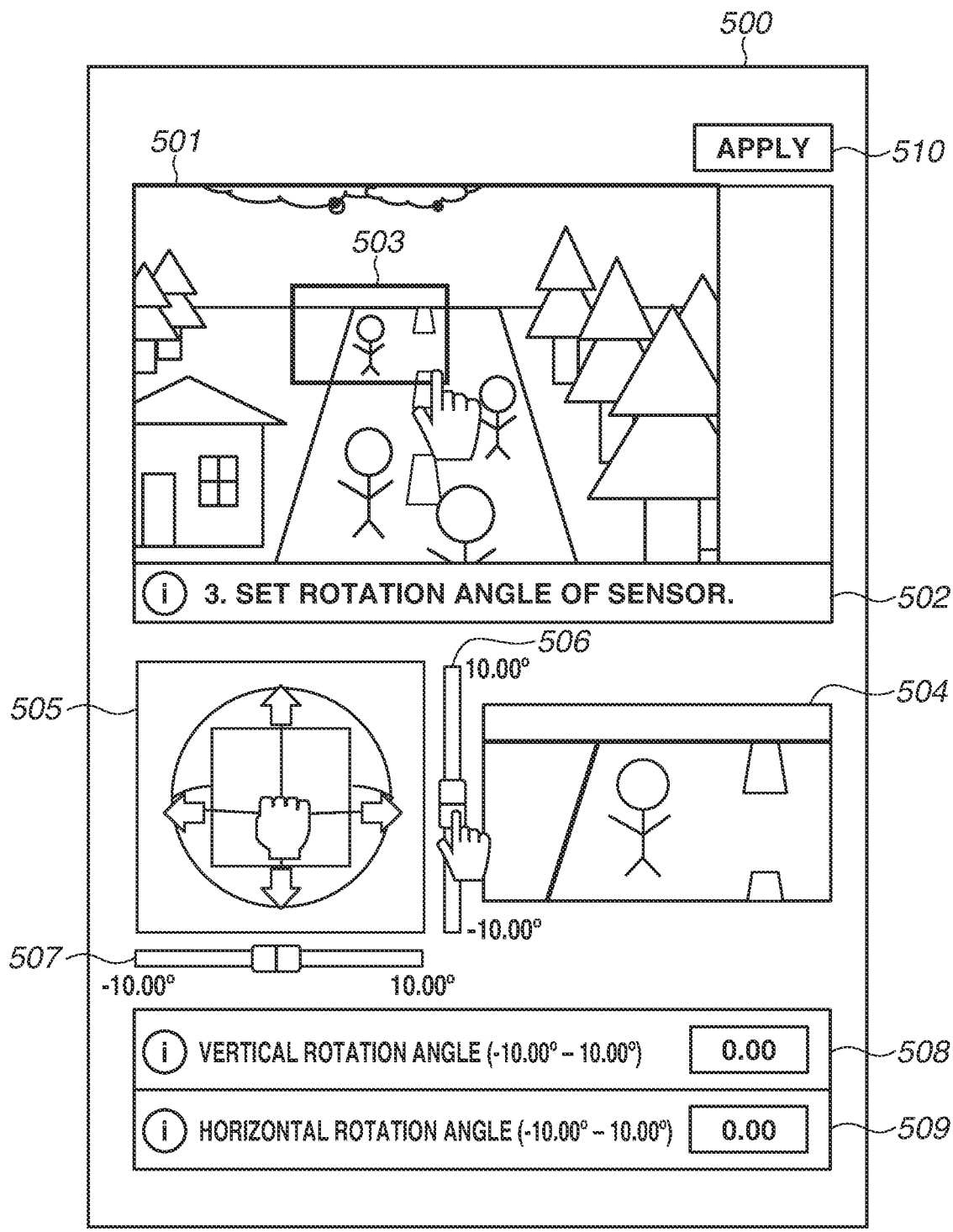
FIG. 5 is a diagram illustrating a display example of a tilt angle setting screen.

FIG. 5 is a diagram illustrating a display example of the tilt angle setting screen 500 to be displayed on the display unit 222 of the control apparatus 110. The tilt angle setting screen 500 includes a video display area 501, a text display area 502, and a clipping area designation frame 503. When a designation frame is placed at a desired position by a user operation, the system control unit 223 receives designation of a partial area in the designation frame. The system control unit 223 then displays the partial area in an enlargement display area 504. Processing for receiving the designation of the partial area is an example of area reception processing. The tilt angle setting screen 500 further includes a rotation control interface 505 for the imaging element, a vertical rotation control slider bar 506 for the imaging element, and a horizontal rotation control slider bar 507 for the imaging element. The tilt angle setting screen 500 further includes a display field 508 for a vertical tilt angle of the imaging element, a display field 509 for a horizontal tilt angle of the imaging element, and an application button 510 for terminating the setting of the rotation.

In the tilt angle setting screen 500, a user operation for changing the setting values of camera parameters that affect the tilt angle adjustment is prohibited. The control apparatus 110 receives the information about the rotation from the monitoring camera 100, and displays the received information on the tilt angle setting screen 500.

The live video image delivered from the monitoring camera 100 is displayed in the video display area 501. Information for prompting the user to set the tilt angle and information about the rotation including a tilt angle setting value and a settable rotation direction are displayed in the text display area 502. Information such as an explanation of each of a control interface and a video image displayed on the tilt angle setting screen 500 is also displayed in the text display area 502.

The tilt angle setting screen 500 has a function of clipping a portion of the video image displayed in the video display area 501 and displaying the clipped portion in enlarged manner so that the user can confirm that an object looking small in the distance is in-focus state. The user can set at least one frame as the clipping area designation frame 503 on the video display area 501, so that the video image clipped by the designated area is displayed in enlarged manner in the enlargement display area 504. Processing for clipping the video image may be performed by the control apparatus 110 or performed by the monitoring camera 100.

For a rotation axis of the rotation of the imaging element, various rotation axes are conceivable. Examples of the rotation axis include vertical rotation of rotating the imaging element around an axis horizontal to the imaging direction of the monitoring camera 100, and horizontal rotation of rotating the imaging element around an axis vertical to the imaging direction of the monitoring camera 100. For example, in the rotation control interface 505, the user may drag the interface, to vertically rotate or horizontally rotate a three-dimensional model of the imaging element displayed in the rotation control interface 505, while observing at least one of the video display area 501 and the enlargement display area 504. The vertical tilt angle and the horizontal tilt angle of the imaging element of the monitoring camera 100 can be set in this way—i.e. by rotating the imaging element about its vertical axis and horizontal axis. Controllable rotation axes and rotation directions relative to the imaging element of the monitoring camera 100 are also displayed in the rotation control interface 505. In addition, the user can adjust the vertical tilt angle and the horizontal tilt angle of the imaging element, by sliding the vertical rotation control slider bar 506 and the horizontal rotation control slider bar 507, respectively. Further, an effective range of the vertical tilt angle is displayed at both ends of the vertical rotation control slider bar 506, and an effective range of the horizontal tilt angle is displayed at both ends of the horizontal rotation control slider bar 507.

In a case where the user operates any of the rotation control interface 505, the vertical rotation control slider bar 506, and the horizontal rotation control slider bar 507, the control apparatus 110 transmits, to the monitoring camera 100, a setting command for the tilt angle setting via the network 120. The transmitted setting command for the tilt angle setting includes rotation information such as a rotation axis, a rotation direction, and the set tilt angle. Each of the rotation control interface 505, the vertical rotation control slider bar 506, and the horizontal rotation control slider bar 507 is an example of a user interface image. Among the pieces of rotation information for the imaging element received from the monitoring camera 100, the effective range and the setting value for the vertical tilt angle and the effective range and the setting value for the horizontal tilt angle are displayed in the display field 508 for the vertical tilt angle and the display field 509 for the horizontal tilt angle, respectively. In a case where the user presses the application button 510, the control apparatus 110 terminates the setting of the rotation.

Figure 6:
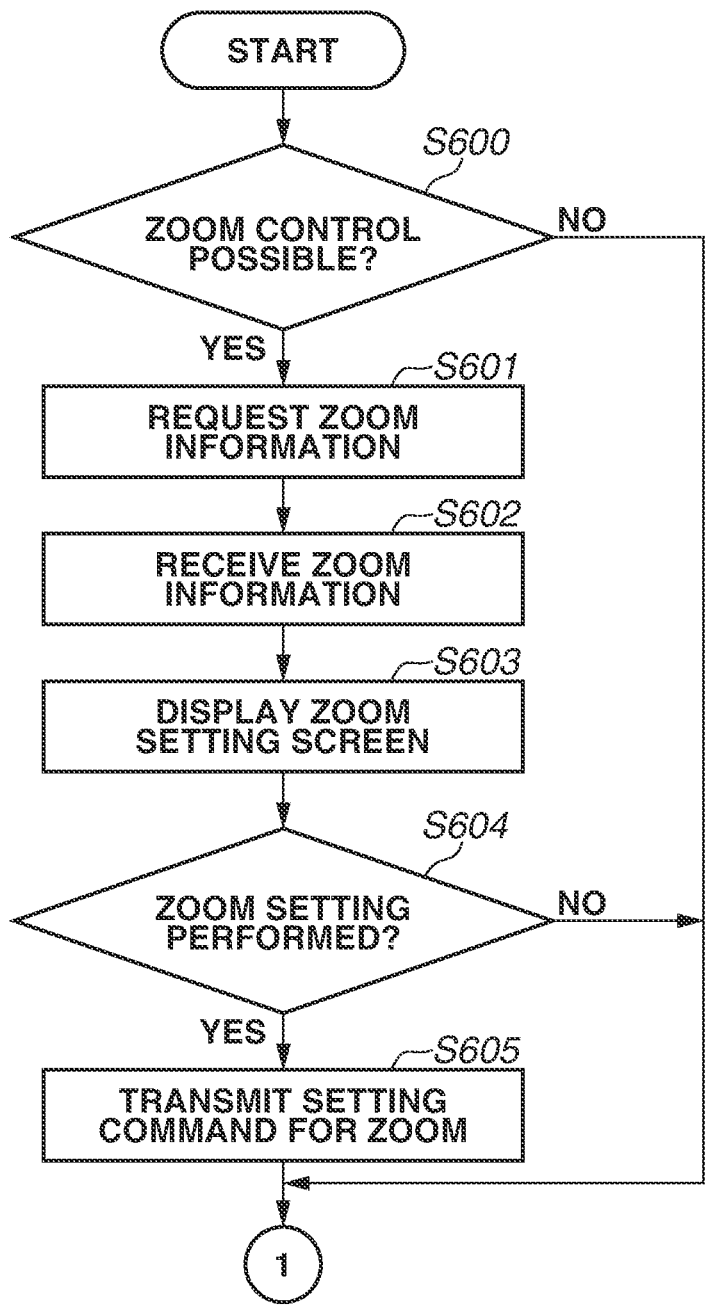
FIG. 6 is a flowchart illustrating setting processing.
Figure 7:
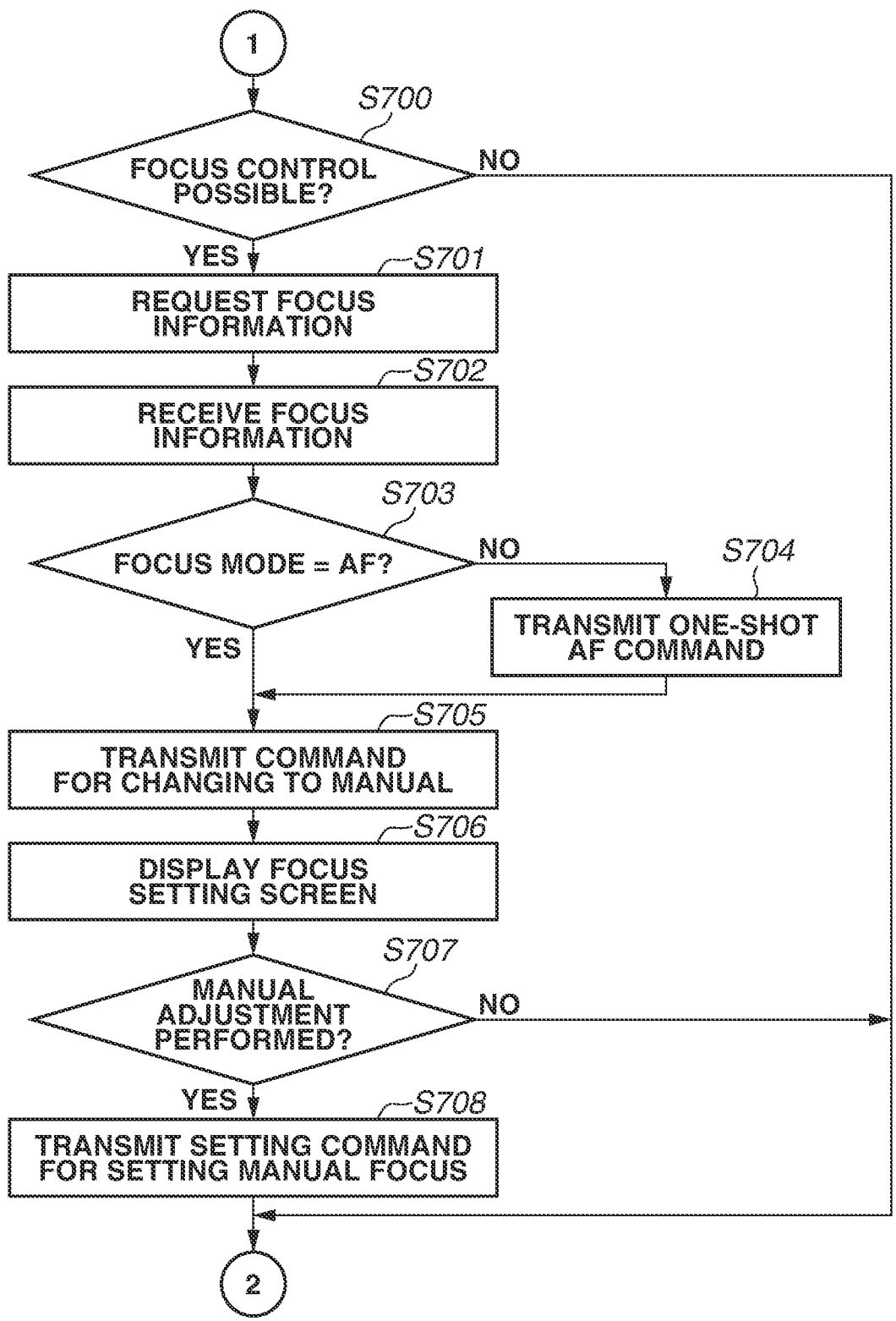
FIG. 7 is a flowchart illustrating setting processing.
Figure 8:
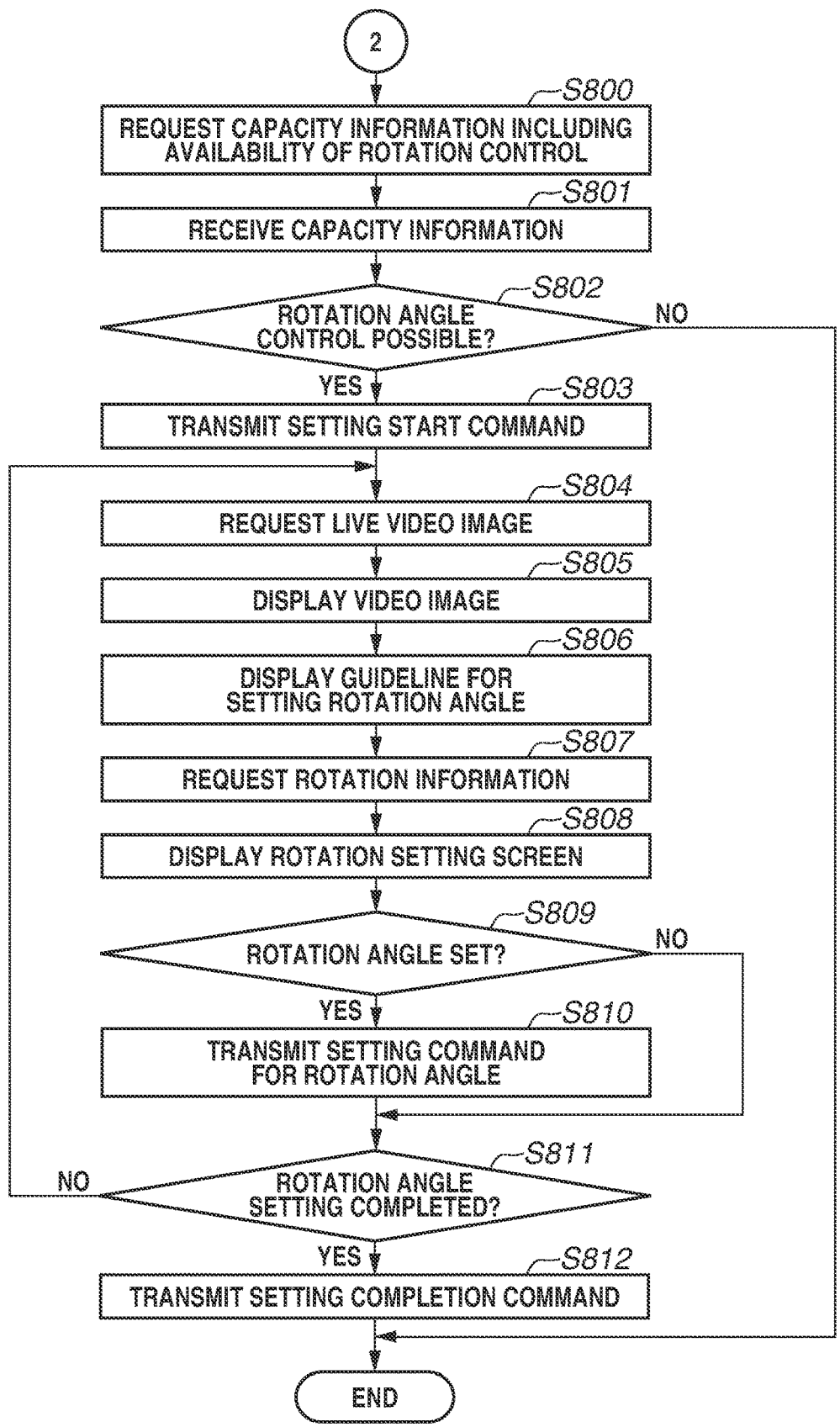
FIG. 8 is a flowchart illustrating setting processing.

FIG. 6 to FIG. 8 are flowcharts illustrating setting processing performed by the control apparatus 110. In step S600 in FIG. 6, the system control unit 223 determines whether the monitoring camera 100 has a zoom control mechanism, and whether zoom control from the control apparatus 110 is possible, with both determinations being based on capacity information acquired from the monitoring camera 100 beforehand. If the monitoring camera 100 has the zoom control mechanism and the zoom control from the control apparatus 110 is possible (YES in step S600), the processing proceeds to step S601. If the zoom control from the control apparatus 110 is not possible (NO in step S600), the processing proceeds to step S700 in FIG. 7.

In step S601, the system control unit 223 requests the monitoring camera 100 to provide the zoom information of the monitoring camera 100. In step S602, the system control unit 223 receives the zoom information of the monitoring camera 100 from the monitoring camera 100. In step S603, the system control unit 223 displays the zoom setting screen 300 on the display unit 222, together with the received zoom information.

In step S604, the system control unit 223 determines whether the zoom setting is performed by a user operation. When the user performs a zoom setting operation on the zoom setting screen 300, the system control unit 223 receives, from the control apparatus 110, a setting instruction for the zoom. The system control unit 223 subsequently sets the zoom in response to the setting instruction. This processing is an example of angle of view setting processing for the zoom setting in response to an input operation performed on a display screen. When the user places a cursor (e.g. mouse cursor or some other navigation cursor) on the zoom control slider bar 303, and moves the zoom control slider bar 303 while pressing a mouse button, the system control unit 223 sets the zoom in response to this user operation. The user may place the mouse cursor on either of the zoom-in button 304 and the zoom-out button 305 and operate the zoom by pressing the mouse button. If the zoom setting is performed (YES in step S604), the processing proceeds to step S605. If the zoom setting is not performed (NO in step S604), the processing proceeds to step S700.

In step S605, the system control unit 223 transmits a setting command for the zoom setting to the monitoring camera 100. The setting command for the zoom setting is transmitted when the user releases the mouse button from any of the zoom control slider bar 303, the zoom-in button 304, and the zoom-out button 305 on the zoom setting screen 300. The system control unit 223 transmits the designated zoom setting value to the monitoring camera 100, together with the setting command for the zoom setting. This completes the zoom setting.

Next, in step S700 illustrated in FIG. 7, the system control unit 223 determines whether the monitoring camera 100 has a focus control mechanism and whether the focus control from the control apparatus 110 is possible, with both determination being based on the capacity information acquired from the monitoring camera 100 beforehand. If the monitoring camera 100 has the focus control mechanism and the focus control from the control apparatus 110 is possible (YES in step S700), the processing proceeds to step S701. If the focus control from the control apparatus 110 is not possible (NO in step S700), the processing proceeds to step S800 in FIG. 8.

In step S701, the system control unit 223 requests the monitoring camera 100 to provide the focus information of the monitoring camera 100. The focus information is the information about the focus, and includes the focus setting value. In step S702, the system control unit 223 receives the information about the focus of the monitoring camera 100 from the monitoring camera 100. In step S703, the system control unit 223 determines whether the focus mode of the monitoring camera 100 is the AF mode. If the focus mode is the AF mode (YES in step S703), the processing proceeds to step S705. If the focus mode is not the AF mode (NO in step S703), the processing proceeds to step S704.

In a state where the focus mode is not the AF mode, there is a possibility that the central area of the imaging angle of view is not in focus. Therefore, in step S704, the system control unit 223 transmits a command for performing the one-shot AF to the monitoring camera 100 so that the central area of the imaging angle of view becomes in-focus state. In step S705, the system control unit 223 transmits a command for changing the focus mode to the manual mode to the monitoring camera 100. The system control unit 223 then displays the manual mode as the focus mode, in the focus mode display field 403. In step S706, the system control unit 223 displays the focus setting screen 400 on the display unit 222, together with the received information about the focus.

Next, in step S707, the system control unit 223 determines whether the focus setting is performed by a manual operation by the user. In a case where the user adjusts the focus in the manual mode by pressing the focus near adjustment button 405 or the focus far adjustment button 406, the system control unit 223 receives a focus setting instruction. Then, the system control unit 223 performs the focus setting in response to the setting instruction. This processing is an example of focus setting processing. If the focus setting is performed (YES in step S707), the processing proceeds to step S708. If the focus setting is not performed (NO in step S707), the processing proceeds to step S800 in FIG. 8. In step S708, the system control unit 223 transmits a setting command for setting the manual focus to the monitoring camera 100. This completes the focus setting.

Next, in step S800 illustrated in FIG. 8, the system control unit 223 requests the monitoring camera 100 to provide the capacity information of the monitoring camera 100. The capacity information includes information indicating whether the monitoring camera 100 has a rotation control mechanism for tilting the imaging element, and whether the tilt angle control from the control apparatus 110 is possible. In step S801, the system control unit 223 receives the capacity information from the monitoring camera 100. In step S802, the system control unit 223 determines whether the monitoring camera 100 has the rotation control mechanism for tilting the imaging element and whether the tilt angle control from the control apparatus 110 is possible. If the monitoring camera 100 has the rotation control mechanism for the imaging element and the tilt angle control from the control apparatus 110 is possible (YES in step S802), the processing proceeds to step S803. If the tilt angle control from the control apparatus 110 is not possible (NO in step S802), the system control unit 223 terminates the setting processing.

In step S803, the system control unit 223 transmits, to the monitoring camera 100, a setting start command for declaring the tilt angle setting start. Afterward, the control apparatus 110 cannot transmit, to the monitoring camera 100, a change command for changing the setting values of the camera parameters that affect the tilt angle adjustment, during the setting of the tilt angle. Examples of the camera parameters that affect the tilt angle adjustment include camera parameters for changing the imaging angle of view, the focus parameters, and a day and night mode parameters. However, a change command for changing the setting values of camera parameters that do not affect the tilt angle adjustment can be transmitted from the control apparatus 110 to the monitoring camera 100, even during the setting of the tilt angle. Examples of the camera parameters that do not affect the tilt angle adjustment include gain parameters, shutter speed parameters, and white balance parameters.

Next, in step S804, the system control unit 223 requests the monitoring camera 100 to provide the live video image. In step S805, the system control unit 223 displays the tilt angle setting screen 500 on the display unit 222, and displays the live video image received from the monitoring camera 100 in the video display area 501 on the tilt angle setting screen 500. In step S806, the system control unit 223 displays a text as a guideline for the tilt angle setting, in the text display area 502 on the tilt angle setting screen 500.

Next, in step S807, the system control unit 223 requests the monitoring camera 100 to provide the rotation information for the imaging element of the monitoring camera 100. The rotation information is the information about the rotation, and includes a controllable rotation axis, a rotation direction, the current value of the tilt angle, and information indicating the effective range of the tilt angle. Next, in step S808, the system control unit 223 receives the information about the rotation of the imaging element from the monitoring camera 100. Then, the system control unit 223 displays the tilt angle setting screen 500. The system control unit 223 displays a diagram representing the controllable rotation axis, the rotation direction, and the current orientation of the imaging element, in the rotation control interface 505 of the tilt angle setting screen 500. In addition, the system control unit 223 displays the current value of the vertical tilt angle and the effective range of the vertical tilt angle on the vertical rotation control slider bar 506, and displays the current value of the horizontal tilt angle and the effective range of the horizontal tilt angle on the horizontal rotation control slider bar 507. Further, the system control unit 223 displays the current value and the effective range of the vertical tilt angle in the display field 508, and displays the current value and the effective range of the horizontal tilt angle in the display field 509.

Next, in step S809, the system control unit 223 determines whether the tilt angle setting is performed. In a case where the tilt angle setting is performed via the rotation control interface 505, the vertical rotation control slider bar 506, or the horizontal rotation control slider bar 507, the system control unit 223 receives a setting instruction, and sets the tilt angle in response to the setting instruction. This processing is an example of tilt angle setting processing. If the tilt angle setting is performed (YES in step S809), the processing proceeds to step S810. If the tilt angle is not set (NO in step S809), the processing proceeds to step S811.

In step S810, the system control unit 223 transmits, to the monitoring camera 100, a setting command for the tilt angle setting. The transmitted setting command for the tilt angle setting includes information about a rotation axis, a rotation direction, and the set tilt angle. Since the setting start command has already transmitted in step S803, changing a parameter that affects the tilt angle corresponding to the setting command transmitted in step S810 in the monitoring camera 100 is restricted. The processing in step S803 is an example of control processing for not changing the parameter that affects the tilt angle after the tilt angle setting is performed.

Next, in step S811, the system control unit 223 determines whether the tilt angle setting is completed via the press of the application button 510 on the tilt angle setting screen 500. If the tilt angle setting is completed (YES in step S811), the processing proceeds to step S812. If the tilt angle setting is not completed (NO in step S811), the processing returns to step S804 to continue the processing. In step S812, the system control unit 223 transmits a setting completion command for declaring completion of the tilt angle setting to the monitoring camera 100. This completes the setting processing.

Figure 9:
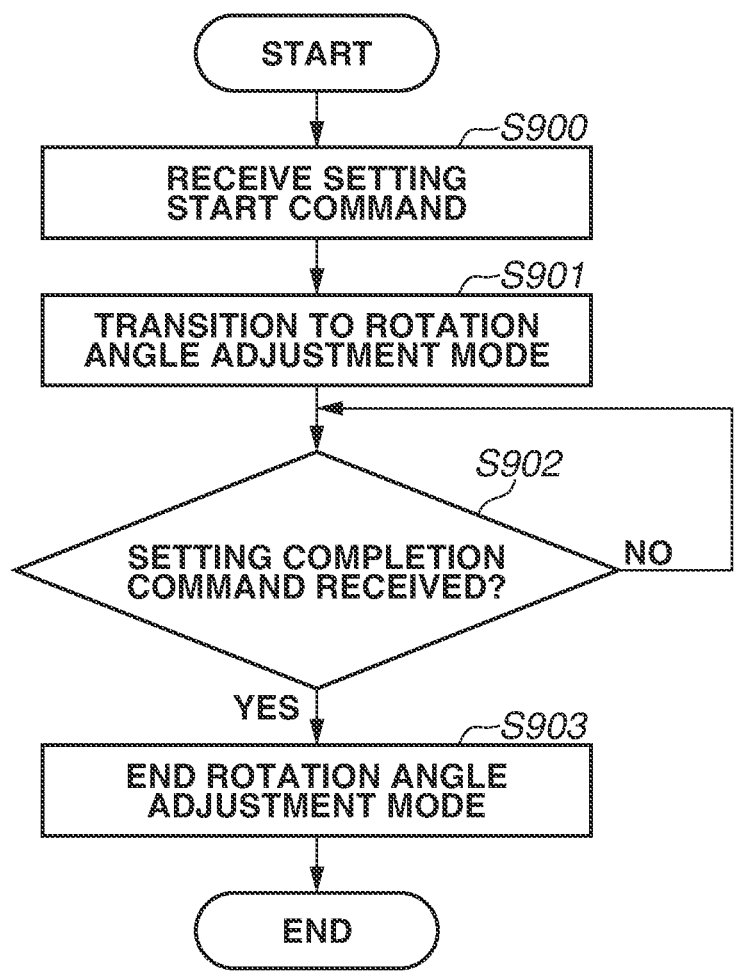
FIG. 9 is a flowchart illustrating mode management processing.

FIG. 9 is a flowchart illustrating mode management processing by the monitoring camera 100. In step S900, the system control unit 203 receives a setting start command for starting the tilt angle setting, from the control apparatus 110. In step S901, the system control unit 203 transitions to a tilt angle adjustment mode. The tilt angle adjustment mode is a mode of the monitoring camera 100 during the tilt angle setting. During the tilt angle adjustment mode, the system control unit 203 performs control to prevent any of the setting values of the camera parameters that affect the tilt angle adjustment from being changed—for example, the system control unit 203 prevent the zoom setting values of the camera 100 from being changed. Thus, for example, when receiving a change command for changing the setting values of the camera parameters that affect the tilt angle adjustment in the tilt angle adjustment mode, the system control unit 203 may discard the setting value and transmit a response indicating a request error. Alternatively, the system control unit 203 may save the setting value in a buffer, and make the change after the tilt angle adjustment mode ends. Still alternatively, the system control unit 203 may round the setting value to a range that does not affect the tilt angle adjustment, and reflect the rounded setting value.

Next, in step S902, the system control unit 203 determines whether a setting completion command for the tilt angle is received from the control apparatus 110. If the setting completion command is not received (NO in step S902), the system control unit 203 waits until the setting completion command is received. If the setting completion command is received (YES in step S902), the processing proceeds to step S903. In step S903, the system control unit 203 ends the tilt angle adjustment mode. Upon completion of the tilt angle adjustment mode, the system control unit 203 permits the change of the setting values of the camera parameters that affects the tilt angle adjustment.

Figure 10:
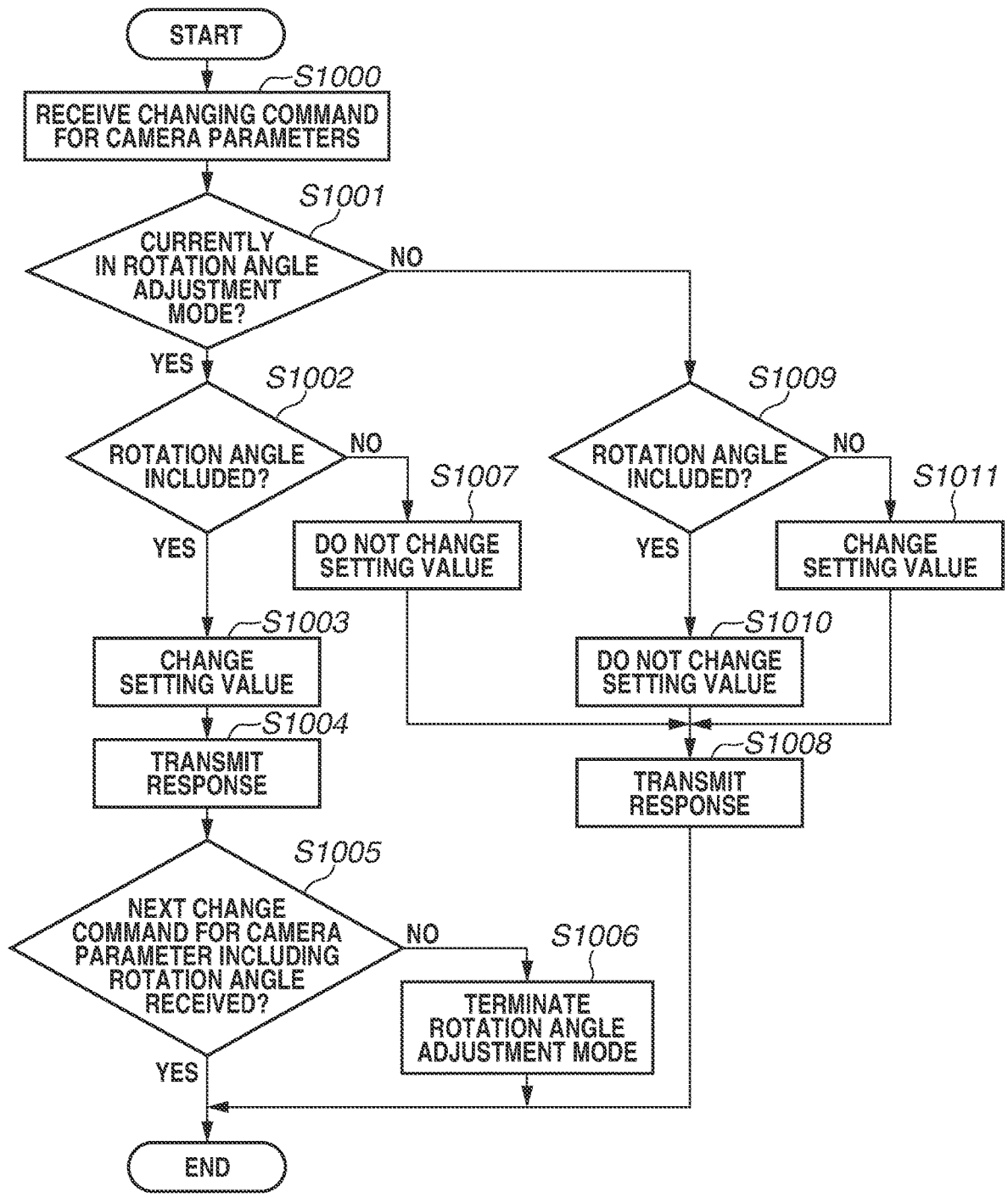
FIG. 10 is a flowchart illustrating parameter management processing.

FIG. 10 is a flowchart illustrating parameter management processing by the monitoring camera 100. In step S1000, the system control unit 203 receives, from the control apparatus 110, a change command for changing the setting values of the camera parameters. In step S1001, the system control unit 203 determines whether the monitoring camera 100 is currently in the tilt angle adjustment mode. If the monitoring camera 100 is in the tilt angle adjustment mode (YES in step S1001), the processing proceeds to step S1002. If the monitoring camera 100 is not in the tilt angle adjustment mode (NO in step S1001), the processing proceeds to step S1009.

In step S1002, the system control unit 203 determines whether the command received in step S1000 is the change command for changing the setting values of the camera parameters including the tilt angle. If the tilt angle is included in the received command (YES in step S1002), the processing proceeds to step S1003. If the tilt angle is not included in the received command (NO in step S1002), the processing proceeds to step S1007. In step S1003, the system control unit 203 determines that the change command for changing the setting values of the camera parameters including the tilt angle is received in the tilt angle adjustment mode, and changes the setting values of the camera parameters including the tilt angle at the time of the processing. Next, in step S1004, the system control unit 203 transmits a response to the setting command received in step S1000, to the control apparatus 110.

Next, in step S1005, the system control unit 203 determines whether the next change command for changing the setting values of the camera parameters including the tilt angle is received before the lapse of a predetermined time period. If the next change command is received (YES in step S1005), the system control unit 203 terminates the parameter management processing while maintaining the tilt angle adjustment mode. If the predetermined time period has elapsed without receiving the next change command (NO in step S1005), the processing proceeds to step S1006. In step S1006, the system control unit 203 terminates the tilt angle adjustment mode. This completes the parameter management processing.

In step S1007, the system control unit 203 determines that a change command for changing the parameter that affects the tilt angle adjustment is received during the tilt angle adjustment mode, and performs control so as not to change the setting value of the parameter at the time of the processing. The system control unit 203 may discard the received setting value for the parameter that affects the tilt angle adjustment. Alternatively, the system control unit 203 may save the received setting value in a buffer, and make the change after the tilt angle adjustment mode is terminated. Next, in step S1008, the system control unit 203 transmits a response to the setting command received in step S1000 to the control apparatus 110. This completes the parameter management processing.

In step S1009, the system control unit 203 determines whether the command received in step S1000 is the change command for changing the setting values of the camera parameters including the tilt angle. If the tilt angle is included in the received command (YES in step S1009), the processing proceeds to step S1010. If the tilt angle is not included in the received command (NO in step S1009), the processing proceeds to step S1011. In step S1010, the system control unit 203 determines that the change command for changing the setting values of the camera parameters including the tilt angle is received when the monitoring camera 100 is not in the tilt angle adjustment mode, and performs control so as not to change the setting values of the camera parameters at the time of the processing. The processing then proceeds to step S1008. In step S1011, the system control unit 203 determines that a change command for changing the camera parameters that affect the tilt angle adjustment is received when the monitoring camera 100 is not in the tilt angle adjustment mode, and changes the setting values of the camera parameters at the time of the processing. Then, the processing proceeds to step S1008.

As for a response, the system control unit 203 may transmit a response indicating a successful request or may transmit a response indicating a request error, regardless of the result of changing the setting values of the camera parameters.

As described above, upon receiving the command for declaring the start of the tilt angle setting from the control apparatus 110, the monitoring camera 100 shifts to the angle adjustment mode, and refrains from changing the setting values of the camera parameters that affect the tilt angle adjustment. Afterward, in a case where the monitoring camera 100 receives the setting completion command, or in a case where the predetermined time period has elapsed without receiving the next change command including the next tilt angle, the monitoring camera 100 permits the change of the setting values of the camera parameters that affect the tilt angle adjustment. In this way, the monitoring camera 100 is controlled not to change the setting values of the camera parameters that affect the tilt angle adjustment, during the adjustment of the tilt angle.

As described above, in a case where the tilt angle setting is performed by the user operation, the control apparatus 110 first displays the zoom setting screen 300 to perform the zoom setting based on the user operation. The control apparatus 110 then displays the focus setting screen 400 and performs the focus setting based on the user operation. Further, after the zoom setting and the focus setting are performed, the control apparatus 110 displays the tilt angle setting screen 500 and performs the tilt angle setting based on the user operation, in the set zoom state and focus state. In this way, the control apparatus 110 can control a setting sequence.

If the focus state and the zoom state are not fixed during the rotation adjustment, an optimum tilt angle cannot be set. In contrast, as described above, the control apparatus 110 of the present exemplary embodiment performs the tilt angle setting, after at least the angle of view setting including the zoom setting and the focus setting are completed. For this reason, an optimum tilt angle can be set in the state where the focus and the zoom are set. In addition, the user can observe the enlargement display area 504 that displays the enlarged image of the designated attention area in the video display area 501 on the tilt angle setting screen 500. Further, the user can adjust the tilt angle, by operating the three-dimensional model that visually expresses the state of the tilt angle of the imaging element in the rotation control interface 505, while confirming that the object looking small at a distance is in focus. As described above, the user can readily execute the tilt angle setting for increasing the depth of field. In other words, the control apparatus 110 can appropriately set the tilt angle desired by the user, without performing complicated work. Moreover, the setting of the parameter of the monitoring camera 100 can be smoothly performed.

Further, the control apparatus 110 performs control so as not to change the parameters that affect the tilt angle, during the tilt angle setting. If the camera parameters that affect the tilt angle adjustment is changed during the tilt angle adjustment, a change irrelevant to the tilt angle adjustment occurs in a captured image, and disturbs the tilt angle adjustment. For example, if the focus is not fixed during the rotation adjustment, the position of the lens or the imaging element moves along the optical axis and the focus state changes, due to, for example, a function of the autofocus. For this reason, the tilt angle of the imaging element with respect to the focus state after the change is not the optimum angle, so that an out-of-focus state occurs. In contrast, as described above, the control apparatus 110 according to the present exemplary embodiment restricts the change of the parameters during the tilt angle setting. Therefore, the control apparatus 110 can appropriately set the tilt angle desired by the user, without performing complicated work.

In the present exemplary embodiment, the setting of the zoom is an example of the setting of the angle of view. However, the setting of the angle of view includes, other than the setting of the zoom, various kinds of settings that cause changes in the imaging angle of view, including the panning, the tilting, and the turning of the lens barrel unit of the monitoring camera 100.

For the tilt angle included in the setting command transmitted to the monitoring camera 100, various representations such as a value normalized to an angle value or the effective range of the tilt angle can be used.

The present invention is described in detail above using the exemplary embodiments, but the present invention is not limited to these specific exemplary embodiments. Various forms not departing from the scope of the present invention are also included in the present invention. The above-described exemplary embodiments may be partially combined as appropriate.

The present invention can also be implemented by supplying a program that implements one or more functions of the above-described exemplary embodiments to a system or apparatus via a network or storage medium, and causing one or more processors in a computer of the system or apparatus to read out the program and execute the program. The present invention can also be implemented by a circuit (e.g., application-specific integrated circuit (ASIC)) for implementing one or more functions.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-092329, filed May 11, 2018, which is hereby incorporated by reference herein in its entirety.

What is claimed is:

1. A control apparatus including an imaging element, the imaging element having a tilt angle adjustable with respect to a plane orthogonal to an optical axis of an image pickup optical system, the control apparatus comprising:
   one or more processors; and
   at least one memory storing executable instructions, which when executed by the one or more processors, cause the control apparatus to:
   set the tilt angle of the imaging element; and a
   perform control so as not to change a parameter that affects the tilt angle during the setting of the tilt angle.

2. The control apparatus according to claim 1, wherein tilt angle is set, after setting an angle of view and a focus value.

3. The control apparatus according to claim 1, wherein the parameter includes an angle of view and a focus value.

4. The control apparatus according to claim 1, wherein the parameter includes a day and night mode setting parameter.

5. A control method for controlling a control apparatus including an imaging element, the imaging element having a tilt angle adjustable with respect to a plane orthogonal to an optical axis of an image pickup optical system, the control method comprising:
   setting the tilt angle of the imaging element; and
   performing control so as not to change a parameter that affects the tilt angle during the setting of the tilt angle.

6. A non-transitory computer readable medium storing a program to execute a method for controlling a control apparatus including an imaging element, the imaging element having a tilt angle adjustable with respect to a plane orthogonal to an optical axis of an image pickup optical system, the method comprising:
   setting the tilt angle of the imaging element; and
   performing control so as not to change a parameter that affects the tilt angle during the setting of the tilt angle.

7. A control apparatus for an imaging apparatus including an imaging element, the imaging element having a tilt angle adjustable with respect to a plane orthogonal to an optical axis of an image pickup optical system, the control apparatus being communicably connected to the imaging apparatus via a network, the control apparatus comprising:
   one or more processors; and
   at least one memory storing executable instructions, which when executed by the one or more processors, cause the control apparatus to:

transmit to the imaging apparatus a setting command to set the tilt angle of the imaging element based on a user operation; and control so as not to transmit to the imaging apparatus a change command for changing an angle of view, a focus parameter and a setting mode regarding a day and night mode designated by a user operation during the setting of the tilt angle.

* * * * *